US009017059B1

(12) United States Patent
Schultheis (10) Patent No.: US 9,017,059 B1
(45) Date of Patent: Apr. 28, 2015

(54) COMBINED MIXING AND EXTRUDING DEVICE

(75) Inventor: Douglas Arthur Schultheis, Cumberland, RI (US)

(73) Assignee: Hasbro, Inc., Pawtucket, RI (US)

( * ) Notice: Subject to any disclaimer, the term of this patent is extended or adjusted under 35 U.S.C. 154(b) by 681 days.

(21) Appl. No.: 13/325,338

(22) Filed: Dec. 14, 2011

(51) Int. Cl.
*B28B 3/24* (2006.01)
*B28C 1/16* (2006.01)
*B29C 47/00* (2006.01)
*B29C 47/54* (2006.01)

(52) U.S. Cl.
CPC ... *B28B 3/24* (2013.01); *B28C 1/16* (2013.01); *B29C 47/0002* (2013.01); *B29C 47/54* (2013.01)

(58) Field of Classification Search
CPC .............. B28B 3/20; B28B 3/24; B28B 3/26; B28B 17/02; B28C 1/16; B29C 47/0002; B29C 47/36; B29C 47/54
See application file for complete search history.

(56) References Cited

U.S. PATENT DOCUMENTS

| 2,420,616 | A | * | 5/1947 | Palmer ........................ 425/72.1 |
| 3,264,685 | A | * | 8/1966 | Boggild et al. ............... 425/183 |
| 3,685,936 | A | * | 8/1972 | Meth et al. ................. 425/192 R |
| 3,817,498 | A | | 6/1974 | Frankfurth et al. |
| 4,076,476 | A | | 2/1978 | Ventura |
| 4,815,961 | A | | 3/1989 | Kindred |
| 4,993,932 | A | | 2/1991 | D'Andrade |
| 5,993,188 | A | | 11/1999 | Mak |
| 6,602,066 | B1 | | 8/2003 | Heayes |
| 7,275,924 | B1 | * | 10/2007 | Kreuzer ......................... 425/169 |
| 7,476,097 | B1 | | 1/2009 | Mangelsen |

* cited by examiner

Primary Examiner — Yogendra Gupta
Assistant Examiner — Joseph Leyson
(74) Attorney, Agent, or Firm — Perry Hoffman (57) ABSTRACT

A combined mixing element and extruding plunger disposed on a rod with at least two distinct sections incorporated into a toy extruder for simply yet uniquely mixing and extruding a formable material through rotation of the same rod. The rod is disposed at the container having first and second ends and including at least first and second rod sections disposed there between. The second rod section is threaded and the toy further includes a plunger disposed at the first end of the rod at least partially within a hollow container including an aperture through a surface of the plunger.

20 Claims, 10 Drawing Sheets

COMBINED MIXING AND EXTRUDING DEVICE

BACKGROUND OF THE INVENTION

1. Field of the Invention

The present invention relates to toy extruding devices, and more particularly to a toy extruder combining a mixing element and an extruding plunger disposed on a rod with at least two distinct sections for simply yet uniquely mixing and extruding a formable material through rotation of the same rod. The invention also relates to a method for mixing and extruding a formable material.

2. Background of the Invention

There are many known toy molders and extruders which employ a plunger or piston element for pressing a formable or viscous material though a chamber and out a narrowed outlet. Many of the known toy extruders employ a main screw and/or gear assembly to move the plunger through the chamber, and one known extruder employs a lever operated plunger with an integral push plate for translating the pivoting movement of the lever into a linear movement of the plunger through the chamber.

There are several known toy extruding devices employing a main rotatable screw extending into a hollow chamber and securely attaching to a housing at a threaded opening. The screw is capable of being rotated through the hollow chamber to extrude a formable material, as exemplified and disclosed in U.S. Pat. No. 7,476,097 B1, issued Jan. 13, 2009 to Mangelsen and U.S. Pat. No. 5,993,188 issued Nov. 30, 1999 to Mak. A plunger is affixed to one end of the screw and a handle is affixed to the opposite end for cranking the screw and plunger through the chamber upon rotation of the handle. A formable material is contained within the chamber and extruded from an end of the chamber as the main screw is rotated. Further, Mak discloses a clutch mechanism physically engaging and disengaging from the main screw to regulate rotation of the screw for releasing measured amounts of extruded material from the chamber.

Other known toy extruders employ a drive gear mechanism for activating the movement of a threaded ram member through a chamber for extruding a formable material, as exemplified and disclosed in U.S. Pat. No. 4,815,961, issued Mar. 28, 1989 to Kindred and U.S. Pat. No. 4,993,932, issued Feb. 19, 1991 to D'Andrade. Kindred discloses a crank engaging a pinion gear which in turn engages peripheral gears of a turntable mechanism secured to the threaded ram member. The crank is rotated driving rotation of the turntable to provide screw actuated movement of the ram member for forcing formable material from the chamber. Similarly, D'Andrade discloses a crank wheel engaging a pinion gear which in turn engages a rack secured to the threaded ram member. The crank wheel is rotated to advance the ram member through the chamber and extrude contained formable material.

Another known toy extruder disclosed in U.S. Pat. No. 6,602,066 B1, issued Aug. 5, 2003 to Heayes, includes a chamber with first and second openings and a extruder received at the second opening with a die coupled to the first opening. The extruder advances longitudinally through the chamber relative to the die. Rotation of the extruder causes the chamber and contained formable compound received therein, to rotate relative to the die. Advancement of the extruder forces the rotating formable compound through the die.

Another known toy extruder disclosed in U.S. Pat. No. 4,076,476, issued Feb. 28, 1978 to Ventura, includes a lever operated plunger with an integral push plate for translating the pivoting movement of the lever into a linear movement of the plunger through the chamber. A manually operable lever is pivotally mounted on a housing and includes a sector shaped portion and pairs of integral pins for engaging embossed portions of the plunger to depress the plunger and integral push plate through the chamber extruding formable material contained therein.

Another known toy extruder disclosed in U.S. Pat. No. 3,817,498, issued Jun. 18, 1974 to Frankfurth et al. discloses an extruder having a housing with at least one revolving conveyor element arranged in the housing. The conveyor element has a periphery with a number of projections along its length extending almost up to the inner wall of the housing. A scraper element is arranged at the outlet opening for engaging into the intermediate spaces between the projections.

Significantly, known toy extruders do not include a combined mixing element and extruding plunger disposed on a rod with at least two distinct sections for simply yet uniquely mixing and extruding a formable material through rotation of the same rod. It would be desirable to provide a rod with at least first and second sections disposed at a threaded aperture of a container and including a plunger disposed at an end of the rod and contained at least partially within the container. The plunger further includes an aperture at a surface and a mixing stick received through the plunger at the aperture such that when the first rod section is rotated within the threaded aperture the mixing stick is rotated for mixing a contained formable material, and when further advancement of the rod rotates the second rod section within the threaded aperture the plunger is advanced to extrude the formable material and the mixing stick is slid to a non-engaging position.

SUMMARY OF THE INVENTION

The present invention addresses shortcomings of the prior art to provide a toy extruder with a combined mixing element and extruding plunger disposed on a rod having at least two distinct sections for mixing and extruding a formable material through rotation of the rod.

In one embodiment of the invention, a toy extruder includes a hollow container including a threaded aperture and an outlet, and a rod disposed at the container having first and second ends and including at least first and second rod sections disposed there between, the second rod section being threaded. A plunger is disposed at the first end of the rod at least partially within the hollow container and including an aperture through a surface of the plunger with a mixing stick received through the surface of the plunger at the aperture. A handle is further disposed at the second end of the rod and advances first and second rod sections through the threaded aperture of the container, rotating the plunger and received mixing stick in an engaging position when the first rod section is in the threaded aperture and maintaining a freedom of movement upon rotation of the rod, and advancing the plunger to an extruding position toward the outlet of the container and sliding the mixing stick to a non-engaging position when the second rod section is in the threaded aperture upon rotation of the rod.

In another embodiment of the invention, a third rod section is further disposed between first and second ends of the rod, and in another embodiment of the invention the handle advances the third rod section through the threaded aperture of the hollow container rotating the plunger and received mixing stick at the outlet maintaining the mixing stick in a non-engaging position when the third rod section is in the threaded aperture and maintaining a freedom of movement upon rotation of the rod.

In another embodiment of the invention, a guide element is further disposed at the aperture of the plunger for maintaining proper positioning of the mixing stick moving through the surface of the plunger between engaging and non-engaging positions. In another embodiment, the hollow container includes a first section and a second section and further includes a locking mechanism at an end of each of the first and second sections which open to receive a formable material within the hollow container.

In another embodiment of the invention, at least a portion of the second section is generally cylindrical, and in yet another embodiment, the second section further includes a die at the outlet. In still another embodiment of the invention, one or more protrusions are further disposed at the second section of the container at an end opposite the locking mechanism, and in still yet another embodiment a play set including one or more wells or indentations, each well receiving a protrusion of the hollow container for locking the container into the play set is further included.

In one embodiment of the invention, a method for mixing and extruding a formable material includes the steps of providing a hollow container including a threaded aperture and an outlet, providing a rod at the container having first and second ends and including at least first and second rod sections disposed there between, the second rod section being threaded, and providing a plunger at the first end of the rod at least partially within the hollow container and including an aperture through a surface of the plunger. Further steps include receiving a mixing stick through the surface of the plunger at the aperture, providing a handle at the second end of the rod, rotating the handle advancing the first rod section into the threaded aperture of the container maintaining a freedom of movement of the first rod section, rotating the plunger and advancing the mixing stick to an engaging position when the first rod section is rotated within the threaded aperture, and rotating the handle advancing the second rod section through the threaded aperture advancing the plunger to an extruding position toward the outlet of the container and sliding the mixing stick to a non-engaging position.

In another embodiment of the invention, further steps include providing a third rod section disposed between first and second ends of the rod and advancing the third rod section into the threaded aperture maintaining a freedom of movement upon rotation of the rod rotating the plunger and received mixing stick at the outlet maintaining the mixing stick in a non-engaging position.

In another embodiment of the invention, further steps include rotating the first rod section within the threaded aperture in either of a clockwise direction or a counter clockwise direction, and in yet another embodiment, a further step includes rotating the second rod section in a clockwise direction through the threaded aperture of the container. In still yet another embodiment of the invention, further steps include rotating the third rod section within the threaded aperture in either of a clockwise direction or a counter clockwise direction.

In another embodiment of the invention, further steps include providing first and second container sections and a locking mechanism at an end of each of the first and second sections which open to receive a formable material within the hollow container.

In another embodiment of the invention, a toy extruder includes a hollow container including a threaded aperture and an outlet, a partially threaded rod disposed at the container having first and second ends and including at least a first non threaded section and a second threaded section disposed there between, a plunger disposed at the first end of the rod at least partially within the container and including an aperture through a surface of the plunger, and a mixing stick received through the surface of the plunger at the aperture. Further included is a handle disposed at the second end of the rod wherein the handle advances the rod through the threaded aperture of the container, rotating the plunger and received mixing stick in an engaging position when the first non threaded section of the rod is in the threaded aperture and rotated in either of a clockwise or counter clockwise direction and advancing the plunger to an extruding position toward the outlet of the container and sliding the mixing stick to a non-engaging position when the second threaded rod section is rotated in a clockwise direction within the threaded aperture.

In another embodiment of the invention, a guide element is further included and disposed at the aperture of the plunger for maintaining proper positioning of the mixing stick moving through the surface of the plunger between engaging and non-engaging positions. In yet another embodiment, the hollow container includes a first section and a second section and further includes a locking mechanism at an end of each of the first and second sections which open to receive a formable material within the hollow container.

In still another embodiment of the invention, at least a portion of the second section is generally cylindrical and further includes a die at the outlet. In yet another embodiment, one or more protrusions are further included at the second section of the container at an end opposite the locking mechanism and further including a play set including one or more wells or indentations, each well or indentation receiving a protrusion of the container for locking the container into the play set.

Briefly the present inventions provide a unique toy extruder combining a mixing stick and extruding plunger on a rod having distinct rod sections for mixing and extruding a formable material through rotation of the same rod. The combined mixing element and extruding plunger are disposed on a rod with at least two distinct sections incorporated into a toy extruder for simply yet uniquely mixing and extruding a formable material through rotation of the same rod. The toy includes a hollow container with a threaded aperture and an outlet. A rod is disposed at the container having first and second ends and including at least first and second rod sections disposed there between. The second rod section being threaded and the toy further including a plunger disposed at the first end of the rod at least partially within the hollow container including an aperture through a surface of the plunger. The toy further includes a mixing stick received through the surface of the plunger at the aperture and a handle disposed at the second end of the rod.

BRIEF DESCRIPTION OF THE DRAWINGS

For the purpose of facilitating an understanding of the inventions, the accompanying drawings and description illustrate a preferred embodiment thereof, from which the inventions, structure, construction and operation, and many related advantages may be readily understood and appreciated.

FIG. 5A is a perspective view of the hollow container of the present invention illustrating first and second sections of the container and a locking mechanism at an end of each of the first and second container sections shown open to receive a formable material therein, while

DESCRIPTION OF THE EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope to the present invention.

Figure 1A:
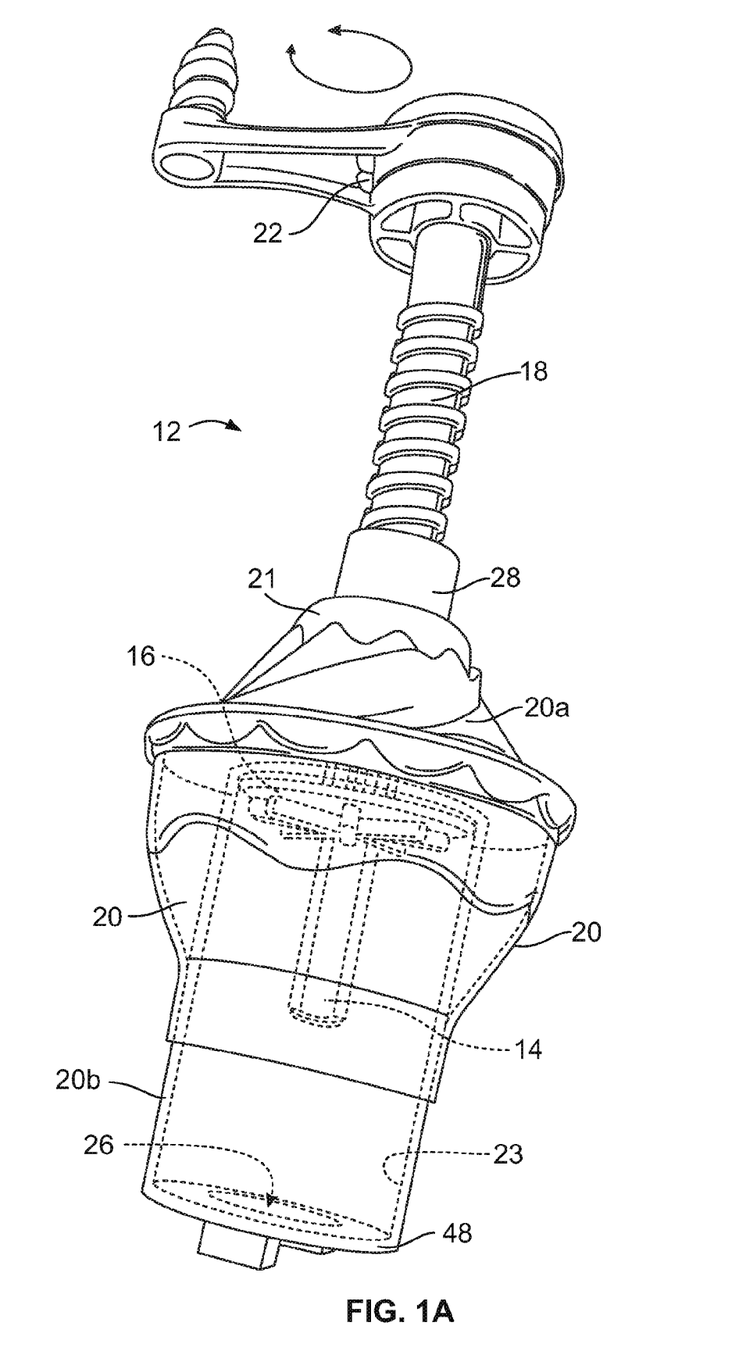
FIG. 1A is perspective views of a toy extruder of the present invention illustrating a hollow container with a rod disposed at least partially therein and further illustrating a first rod section within a threaded aperture of the container rotating a plunger and received mixing stick in an engaging position.
Figure 1B:
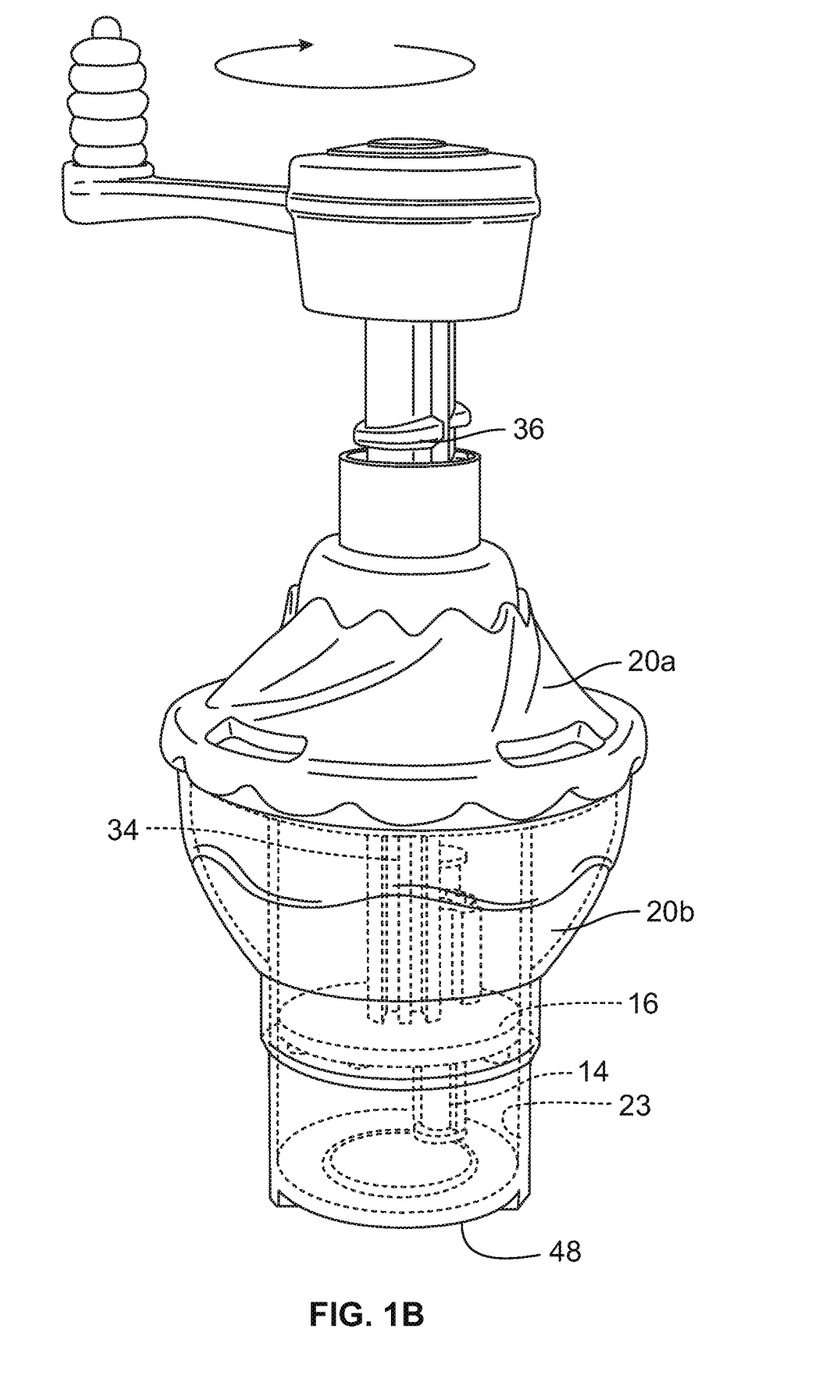
FIG. 1B is a perspective view illustrating a second rod section advancing through the threaded aperture of the container advancing the plunger to an extruding position toward an outlet of the container and sliding the mixing stick to a non-engaging position.
Figure 1C:
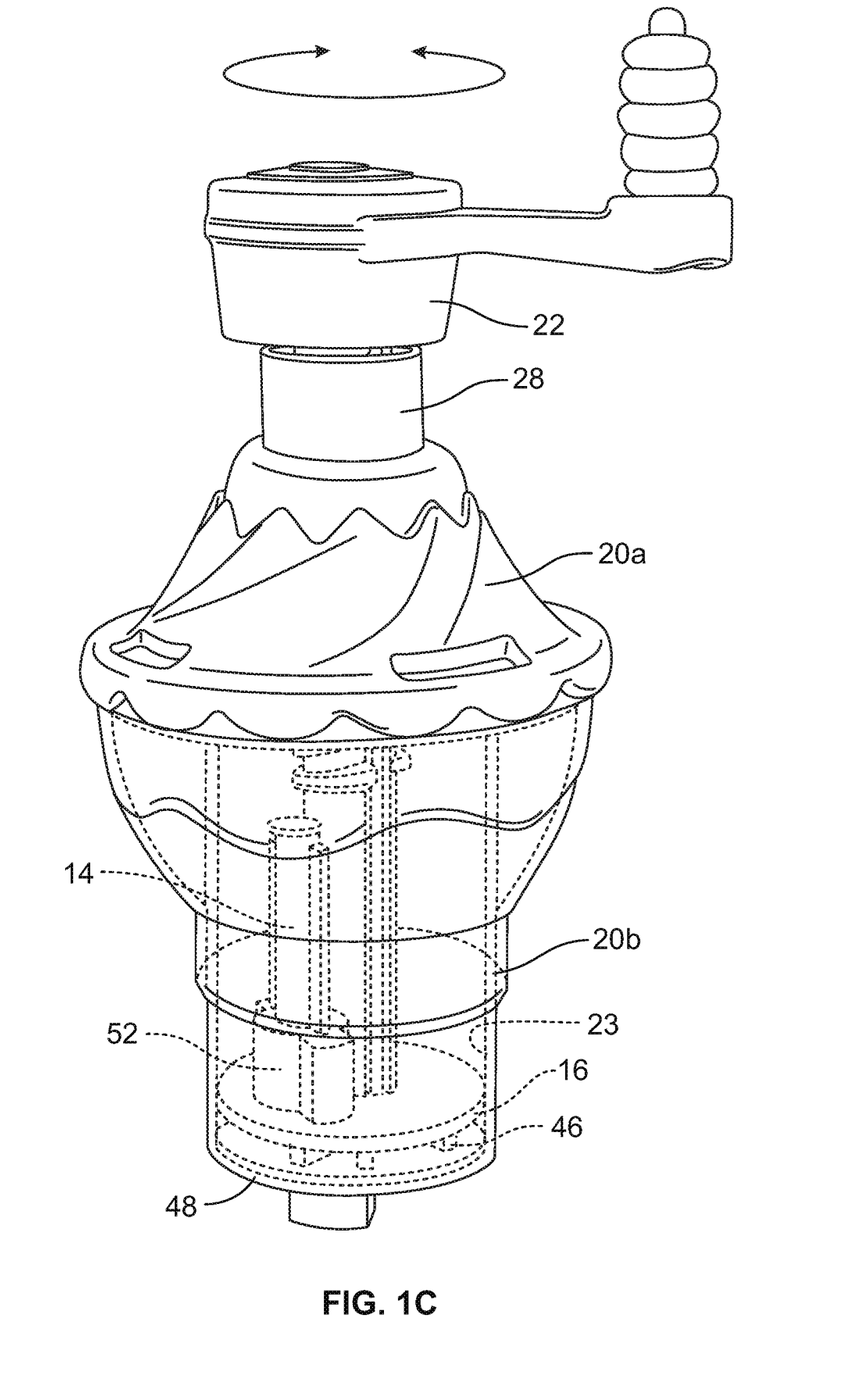
FIG. 1C is a perspective view illustrating a third rod section within the threaded aperture of the container rotating the plunger and received mixing stick at the outlet maintaining the mixing stick in a non-engaging position.

A toy extruder 12, as seen in FIGS. 1A-1C, is generally seen to include a mixing element or stick 14 and an extruding plunger 16 disposed on a rod 18 with at least two distinct sections for simply yet uniquely mixing and extruding a formable material through rotation of the same rod. The plunger 16 is at least partially within a hollow container 20 and includes the mixing stick 14 disposed there through. A handle 22 is disposed at the rod for advancing the rod through the container mixing and extruding the formable material.

Figure 2A:
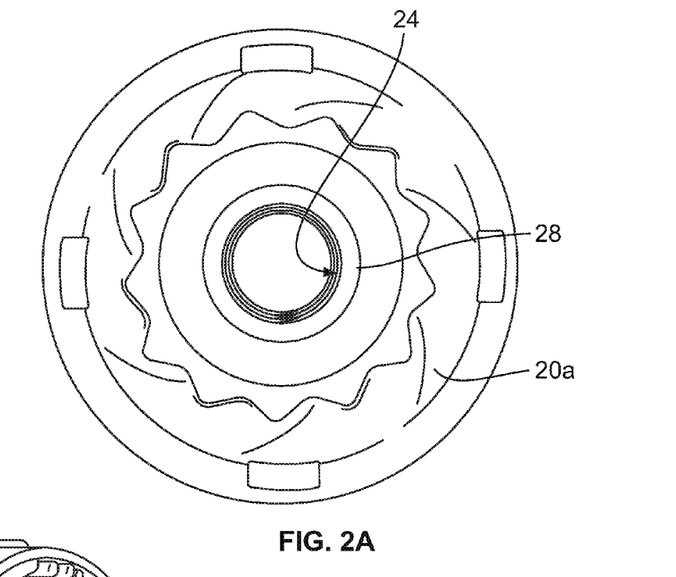
FIG. 2A is a top view of a first section of the container illustrating the threaded aperture.
Figure 2B:
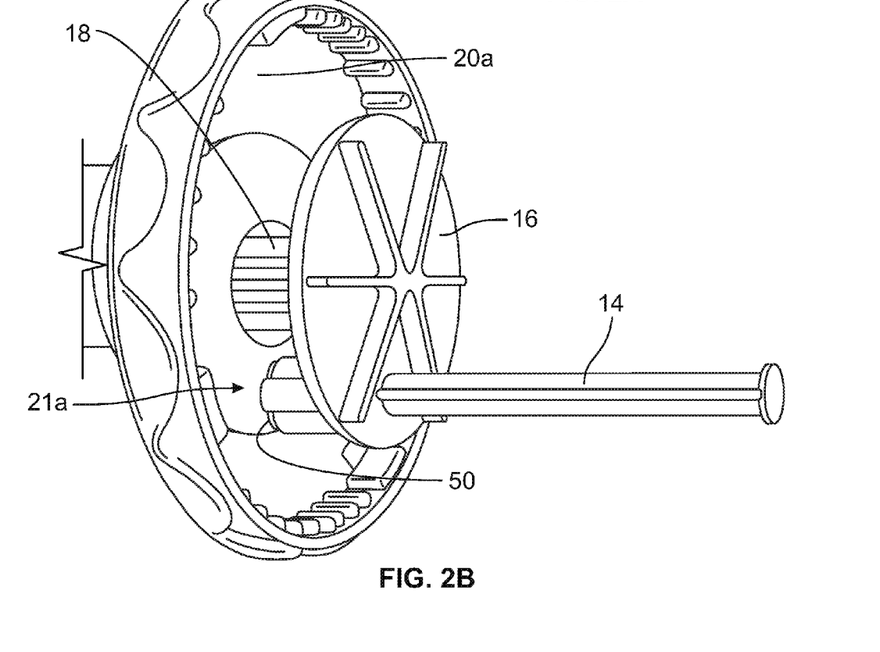
FIG. 2B is a perspective view of an inside of the first section of the container illustrating the mixing stick adjacent a surface on the inside of the first section.

The hollow container 20, as seen in FIGS. 1-2, includes a first section 20a and a second section 20b. Container 20 includes a threaded aperture 24 at the first section 20a and an outlet 26 at the second section 20b. A collar element 28 defines at least a portion of the threaded aperture 24, extending the threaded aperture beyond the container 20.

Figure 5A:
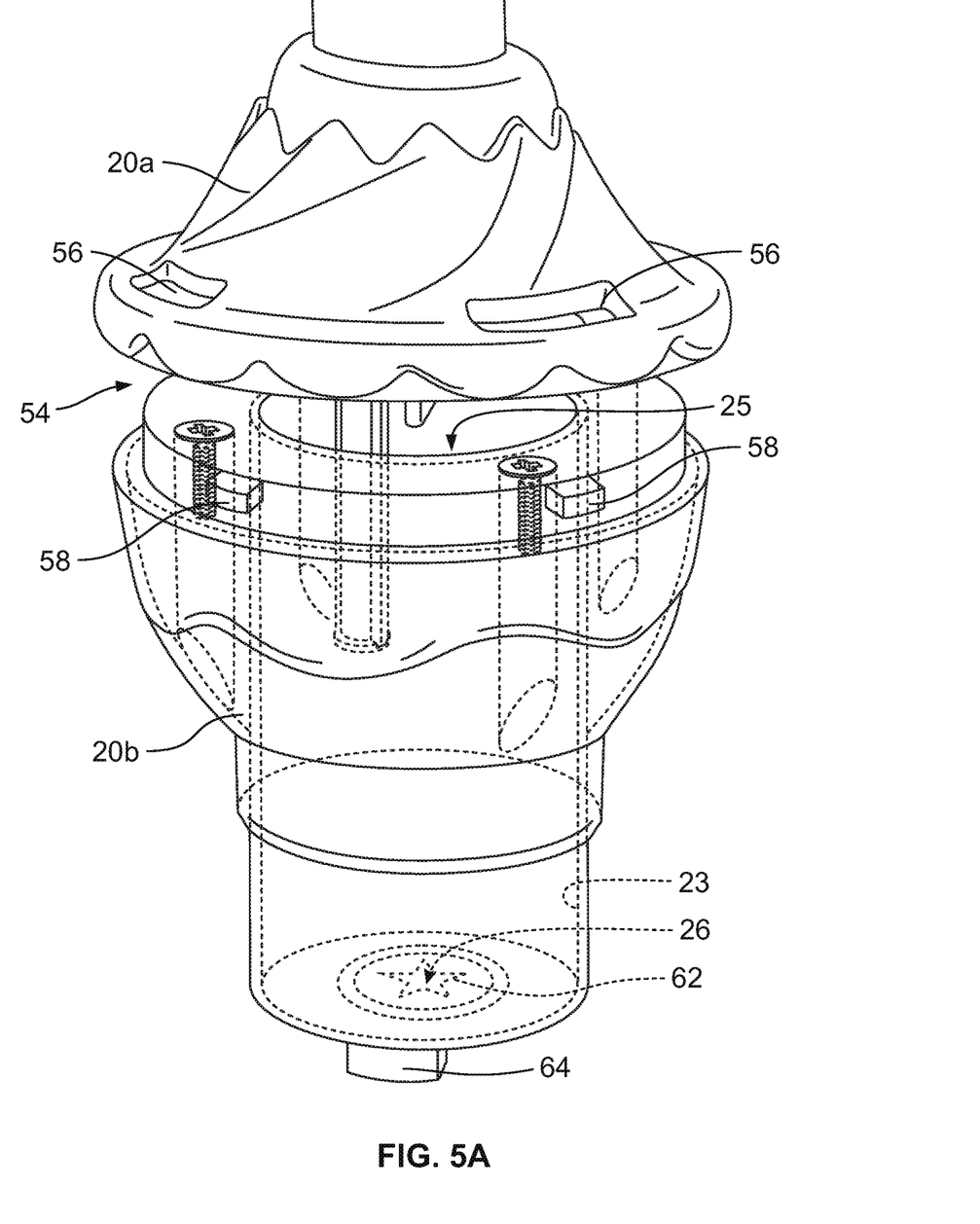
Figure 5B:
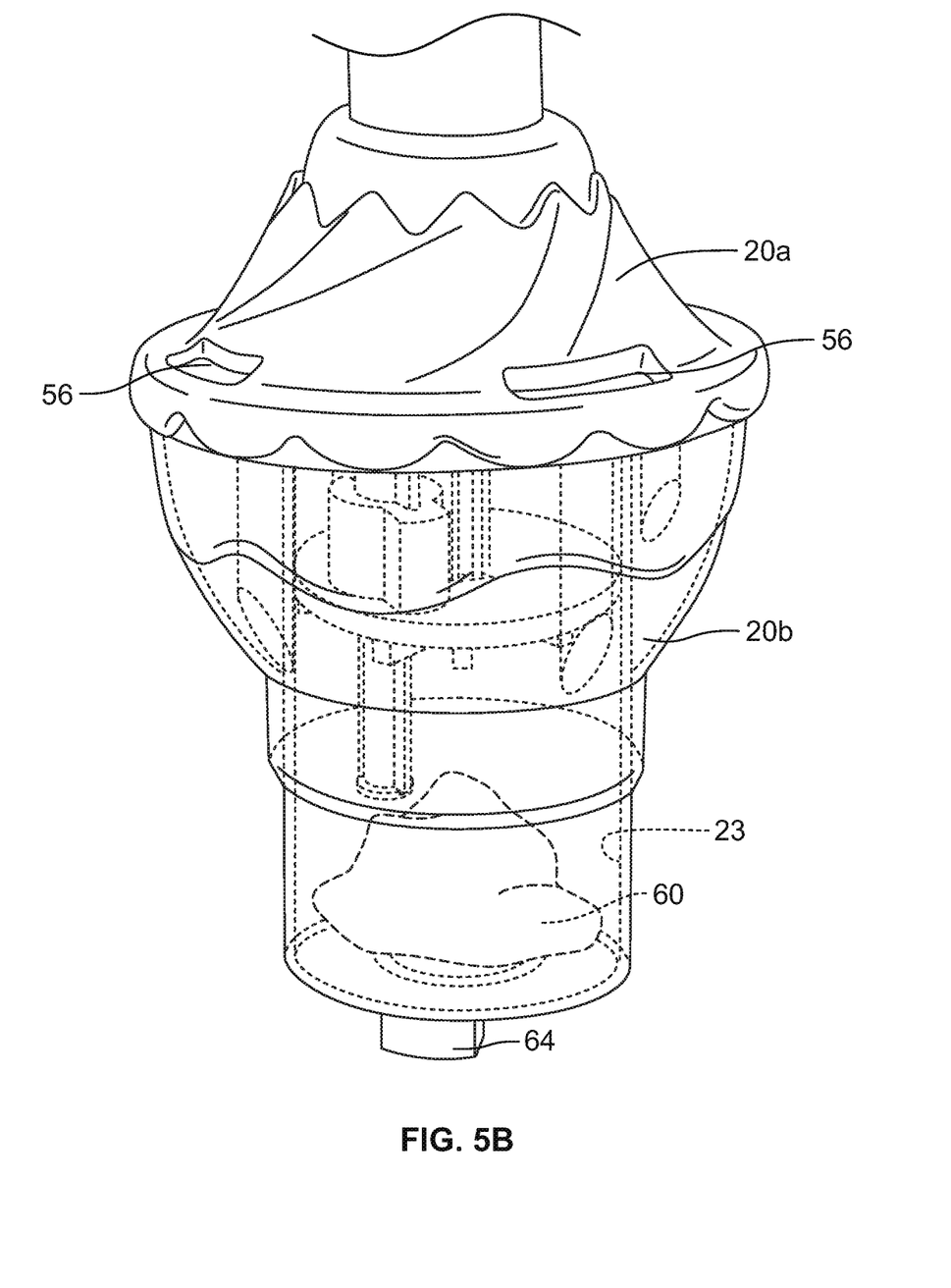
FIG. 5B illustrates the first and second container sections secured together with a formable material contained therein.

In the present described embodiment, first section 20a generally tapers at an end 21 toward aperture 24 and second section 20b is generally cylindrical in shape toward outlet 26. Container 20 includes an inner wall 23 at least at the second section 20b, as seen in FIGS. 1 and 5. Inner wall 23 is a cylindrical wall or tube lining section 20b and extending from opening 25 to outlet 26, as seen in FIG. 5A. Inner wall 23 is only slightly larger in diameter than plunger 16 and generally maintains the same diameter from opening 25 to outlet 26. The inner wall 23 forms a tight seal with extruding plunger 16, guiding plunger 16 as it is rotated through section 20b and assisting in the extrusion of the formable material from outlet 26.

Figure 6:
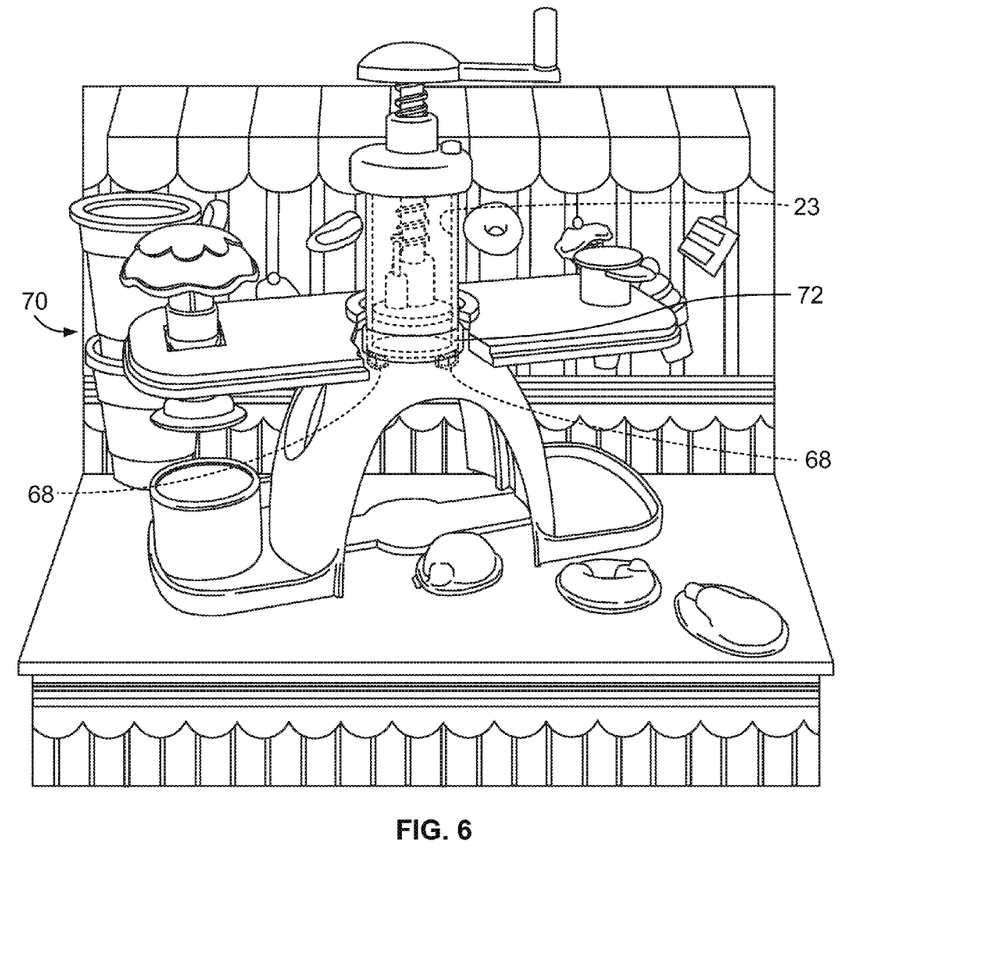
FIG. 6 is a perspective view of a play set of the present invention with a section broken away to illustrate one or more protrusions of the hollow container received into one or more wells of the play set.

Also, in the present described embodiment, inner wall 23 can be described as a cylindrical tube 23 located within container section 20b. Container section 20b is generally built up around and encompassing cylindrical tube 23 which extends through the entire section 20b from opening 25 to outlet 26, as seen in FIGS. 1-5. Further, container section 20b can include only cylindrical tube 23, as seen in FIG. 6, without any additional built up portion encompassing cylindrical tube 23.

In the present described embodiment, both sections 20a and 20b, as well as inner wall/tube 23, are manufactured from a heavy duty molded plastic material which is simple and inexpensive to manufacture into any desired shape and can easily include fun colors and patterns. Molded plastic is strong and rigid enough to maintain its shape and integrity after many years of use and can also be clear and see through, as seen in the present described invention, allowing a child user to delight in watching the mixing/swirling and extruding of a formable material from the container.

Figure 3:
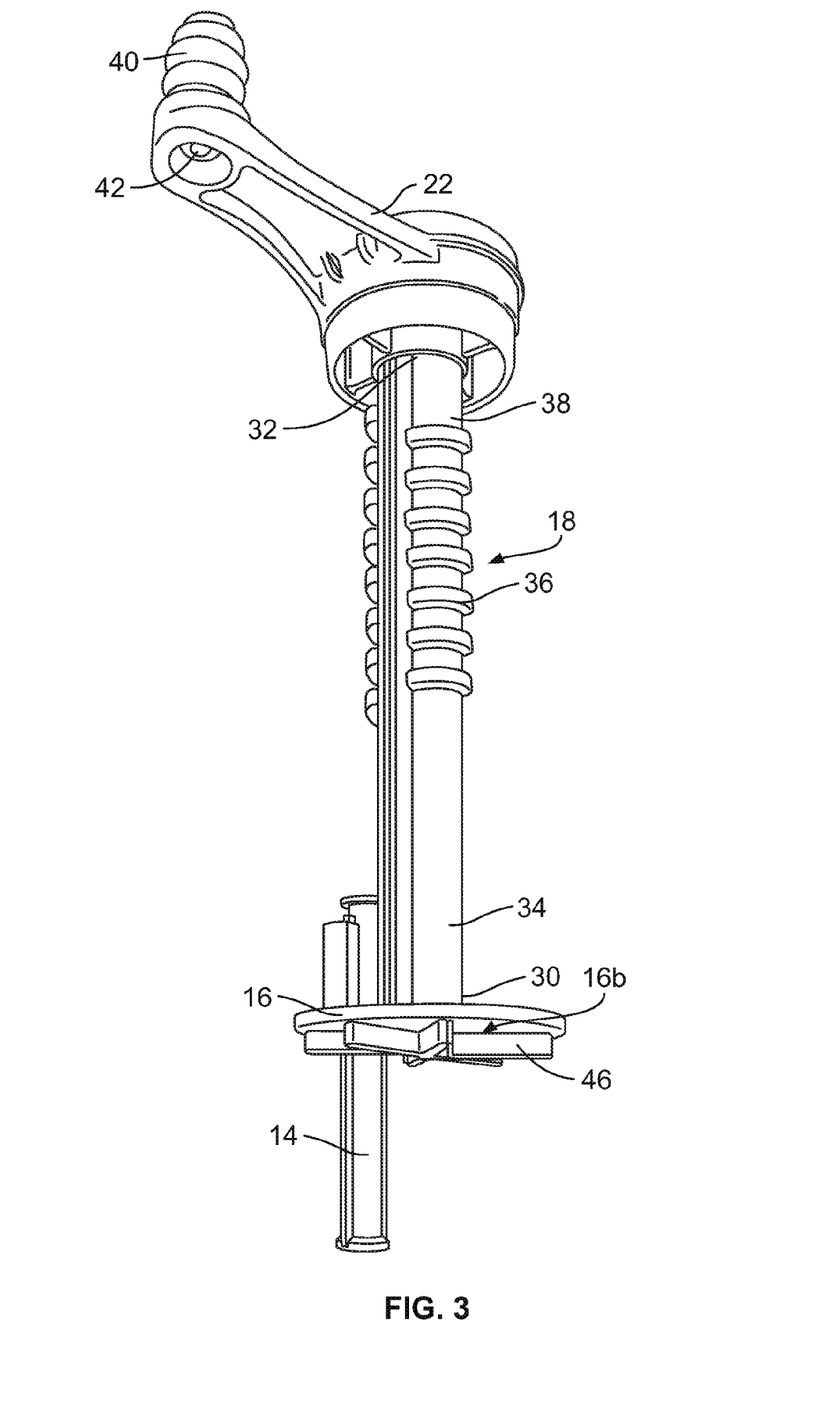
FIG. 3 is a perspective view of the rod of the present invention illustrating three distinct rod sections.

The rod 18 is disposed at the container 20 at the threaded aperture 24, and advances through the threaded aperture into the container 20. The rod 18 includes first end 30 and second end 32, as seen in FIG. 3, and includes at least first rod section 34 and second rod section 36 disposed there between. In the present described invention, rod 18 further includes a third rod section 38 disposed between first and second ends, 30 & 32, respectfully, as seen in FIG. 3.

In the present described embodiment, rod 18 is also manufactured from a heavy duty plastic material and molded to include threaded and non threaded rod sections. As seen in FIG. 3, the first and third rod sections, 34 & 38 respectively, omit threading along the rod, and the second rod section 36 includes integral threads along the rod at section 36. The partially threaded rod 18 is strong and rigid and moves the formable material through the toy extruder 12 as the rod travels through the threaded aperture 24 from the first container section 20a to the second container section 20b.

In the present described embodiment, the handle 22 is disposed at the second end 32 of the rod 18 and the plunger 16 is disposed at the first end 30 of the rod, as seen in FIG. 3. Both the handle 22 and the plunger 16 can be affixed to or integral with rod 18.

Handle 22 advances first, second and third rod sections, 34, 36 & 38 respectfully, through the threaded aperture 24 of the container, and is also manufactured from a strong and rigid plastic. Handle 22 is securely affixed at one end to rod 18 such that rotation of handle 22 will also rotate rod 18. In the present described embodiment, handle 22 is screwed to rod 18, but it is also contemplated that the handle can be glued or secured to the rod by other suitable means.

In the present described embodiment, handle 22 further includes a gripping element 40 secured to an end of the handle opposite the rod, as seen in FIG. 3. The gripping element 40 is rotatably secured to the handle 22 at screw 42 and will rotate with respect to the handle when a user holds the gripping element securely and rotates the handle and affixed rod with respect to the container. This configuration allows the user to maintain a consistent comfortable hold on the gripping element as the handle is rotated around in a clockwise or counter clockwise direction with respect to the container.

Figure 4A:
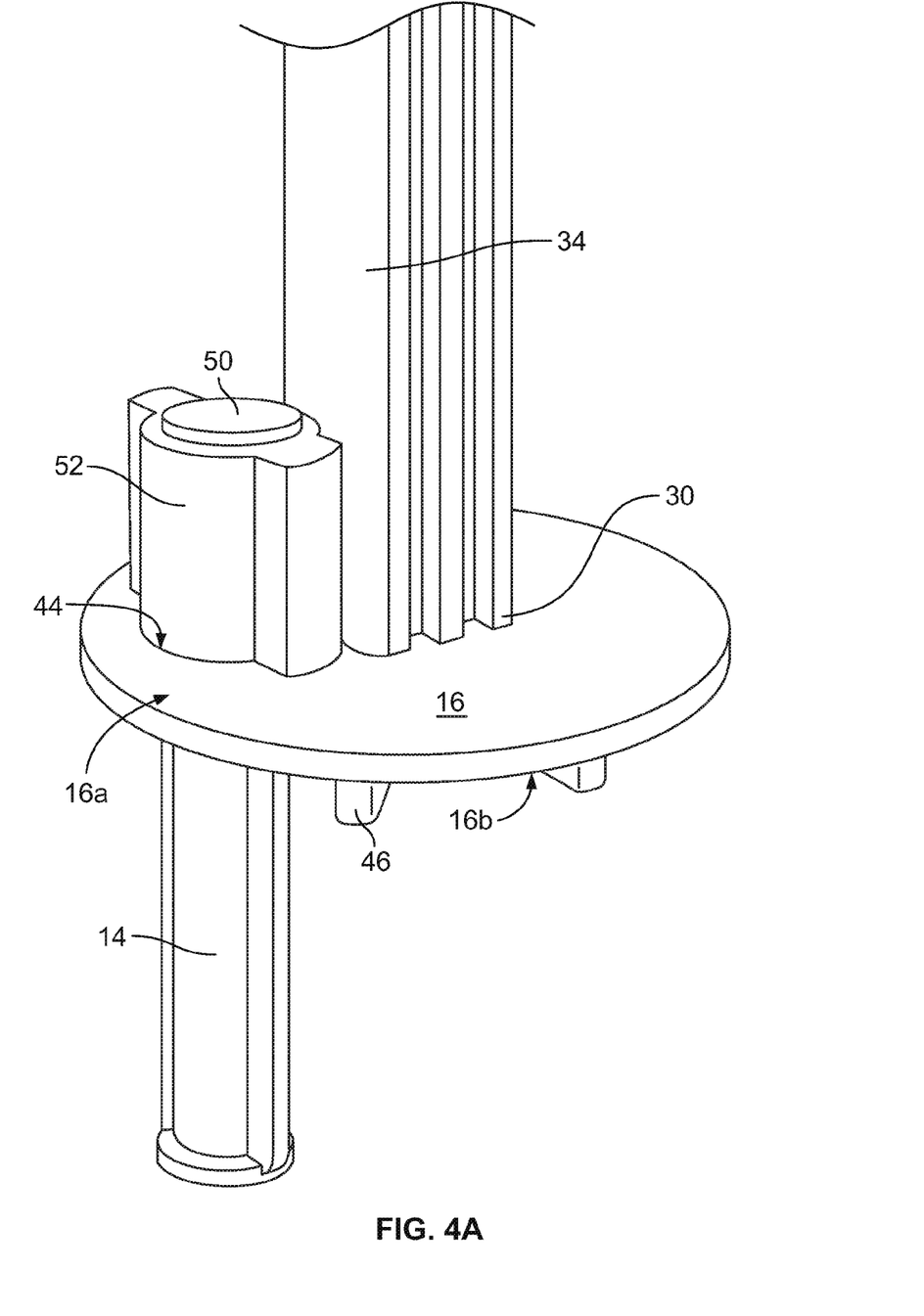
FIG. 4A is a perspective view of the present invention illustrating the plunger at a first end of the rod and a mixing stick slid to an engaging position.
Figure 4B:
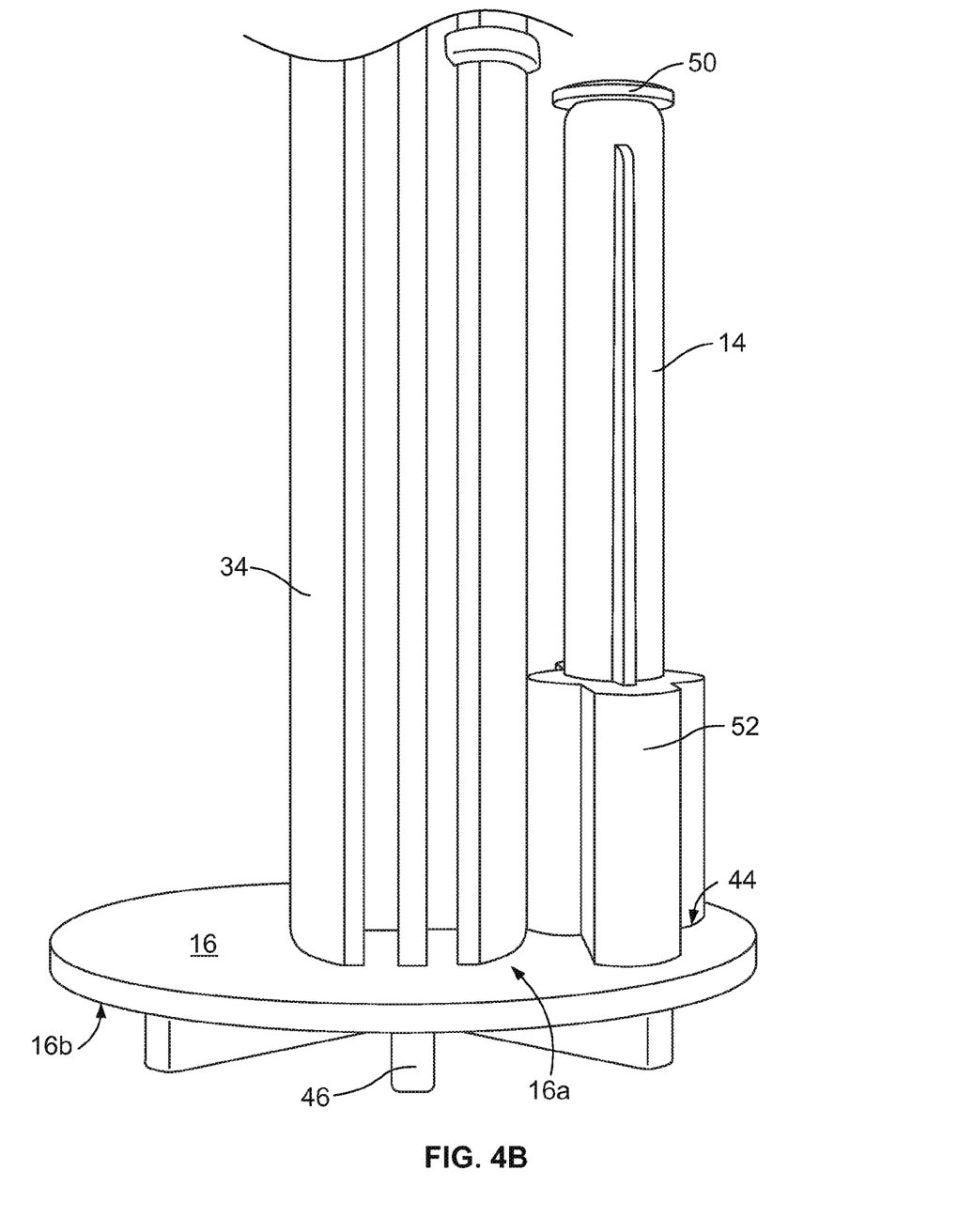
FIG. 4B illustrates the mixing stick slid to a non-engaging position.

The plunger 16 is integral with rod 18 and also manufactured from a strong and rigid plastic material, as seen in FIGS. 3 & 4. The plunger 16 is generally disc shaped and includes an aperture 44 through surfaces 16a & 16b of the plunger. The mixing stick 14 is received through surfaces 16a & 16b of the plunger at the aperture 44. In the present described embodiment, a guiding element 52 is disposed at the aperture 44 of the plunger for maintaining proper positioning of the mixing stick 14 moving through surfaces 16a & 16b of the plunger between engaging and non-engaging positions. Additionally, the plunger 16, as seen in FIG. 3, further includes one or more spacer elements 46 affixed to or integral with plunger 16 at surface 16b for contacting a bottom wall 48 of the container 20 when extruding a formable material out the outlet 26.

In the present described embodiment, handle 22 rotates rod 18 and integral plunger 16, moving plunger 16 between a first non-engaging position and a second engaging extruding position as the plunger moves through the container from the first section 20a to the second section 20b, as seen in FIGS. 1A-1C. Additionally, the mixing stick 14 slides between a first engaging position and a second non-engaging position as the rod 18 is rotated and the integral plunger 16 moves through the container from first section 20a to the second section 20b.

The plunger 16 is in the non-engaging position and positioned at the upper most point within the container 20 when the first rod section 34 is within the threaded aperture, as seen in FIG. 1A. At this upper most point, the received mixing stick 14 is moved into contact with an inside surface 21a of the container 20 at the tapered end 21, as seen in FIG. 2B. A contact tab 50 at an end of the mixing stick 14 rides along surface 21a of the inside of section 20a forcing the mixing stick to the engaging position. The contact tab 50 continues to ride along surface 21a and maintain the mixing stick in a fully extended engaging position as the first rod section 34 is maintained within the threaded aperture upon rotation of the rod. In the present described embodiment, more than half of the length of the mixing stick 14 extends from plunger surface 16b when the mixing stick is in the engaging position, as seen in FIGS. 1A & 2B.

The plunger 16 moves toward the engaging extruding position and rotates through the container section 20b when the second rod section 36 is rotated through the threaded aperture 24, as seen in FIG. 1B. As the plunger travels through container section 20b, the plunger contacts the formable material and extrudes the material out the outlet. At the same time, the fully extended mixing stick contacts the bottom wall 48 of container section 20b and begins to slide to the non-engaging position as the second rod section is rotated through the threaded aperture. The plunger 16 reaches the bottom wall 48 when the third rod section 38 is within the threaded aperture 24, as seen in FIG. 1C. The one or more spacer elements 46 rotate along bottom wall 48 and the formable material is fully extruded as the rod 18 is rotated with third rod section 38 within the threaded aperture. At this fully extruded point, the mixing stick 14 is slid to the fully non-engaging position, as seen in FIG. 1C.

In use, as seen in FIGS. 1A-1C, the handle 22 advances first rod section 34 into the threaded aperture 24 rotating the plunger and received mixing stick in an engaging position, as seen in FIG. 1A. The first rod section 34 is not threaded and maintains a freedom of movement when rotated in the threaded aperture. Rod 18 can be rotated both clockwise and counter clockwise with first rod section 34 in the threaded aperture 24 maintaining the plunger at an upper most position and farthest from the outlet 26 with the mixing stick in an engaging position. Further rotation of rod 18 advances the rod through the threaded aperture 24 rotating the second (threaded) rod section 36 through the aperture and advancing the plunger to an extruding position toward the outlet 26, while at the same time beginning to slid the mixing stick to a non-engaging position, as seen in FIG. 1B. Advancing the third rod section 38 through the threaded aperture rotates the plunger and received mixing stick at the outlet maintaining the mixing stick in a non-engaging position. The third rod section 38 is not threaded and maintains a freedom of movement when rotated in the threaded aperture. Rod 18 can be rotated both clockwise and counter clockwise with third rod section 38 in the threaded aperture 24 maintaining the plunger at the bottom wall 48 of the container and sliding the mixing stick fully to the non-engaging position, as seen in FIG. 1C.

The hollow container 20 further includes a locking mechanism 54 at an end of each of the first and second sections, 20a & 20b respectively, which open to receive the formable material 60 within the hollow container, as seen in FIGS. 5A & 5B. In the present described invention, first section 20a includes one or more slots 56 which slide and lock into one or more protrusions 58 at second section 20b of the hollow container forming the locking mechanism 54.

In the present described embodiment, the hollow container 20 further includes a die 62 at the outlet 26 for extruding interesting and fun shapes from the toy extruder. The hollow container also includes one or more protrusions 64 at the second section 20b at an end opposite the locking mechanism 54, as seen in FIGS. 5A & 5B.

In the present described embodiment, the toy extruder 12 can connect with and enhance a larger play set 70, as seen in FIG. 6. The play set 70 includes one or more well interfaces or indentations 68. Each well interface 68 is shaped to receive a protrusion 64 of the container. A supporting element 72 is included at the play set 70 and receives each well interface 68 there in. The supporting element 72 is generally cylindrical in shape for receiving the generally cylindrical portion of the second section 20b of the container 20. In use, one or more of the protrusions 64 of the container are received into one or more of the well interfaces 68 of the play set 70 for locking the container into the play set.

A method for mixing and extruding a formable material includes the steps of providing a hollow container including a threaded aperture and an outlet, providing a rod at the container having first and second ends and including at least first and second rod sections disposed there between, the second rod section being threaded, providing a plunger at the first end of the rod at least partially within the hollow container and including an aperture through a surface of the plunger, and receiving a mixing stick through the surface of the plunger at the aperture. Further providing a handle at the second end of the rod, rotating the handle advancing the first rod section into the threaded aperture of the container maintaining a freedom of movement of the first rod section, rotating the plunger and advancing the mixing stick to an engaging position when the first rod section is rotated within the threaded aperture, and rotating the handle advancing the second rod section through the threaded aperture advancing the plunger to an extruding position toward the outlet of the container and sliding the mixing stick to a non-engaging position.

The method further includes the steps of rotating the first rod section within the threaded aperture in either of a clockwise direction or a counter clockwise direction, rotating the second rod section in a clockwise direction through the threaded aperture of the container, and rotating the third rod section within the threaded aperture in either of a clockwise direction or a counter clockwise direction. The method further includes steps of providing first and second container sections and a locking mechanism at an end of each of the first and second sections which open to receive a formable material within the hollow container.

From the foregoing, it can be seen that there has been provided a unique toy extruder combining a mixing stick and extruding plunger on a rod having distinct rod sections for mixing and extruding a formable material through rotation of the same rod. While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A toy, comprising:
    a hollow container including a threaded aperture and an outlet;
    a rod disposed at the container having first and second ends and including at least first and second rod sections disposed there between, the second rod section being threaded;
    a plunger disposed at the first end of the rod at least partially within the hollow container and including an aperture through a surface of the plunger;
    a mixing stick received through the surface of the plunger at the aperture; and
    a handle disposed at the second end of the rod;
    wherein the handle advances first and second rod sections through the threaded aperture of the container, rotating the plunger and received mixing stick in an engaging position when the first rod section is in the threaded aperture and maintaining a freedom of movement upon rotation of the rod, and advancing the plunger to an extruding position toward the outlet of the container and sliding the mixing stick to a non-engaging position when the second rod section is in the threaded aperture upon rotation of the rod.

2. The toy according to claim 1, further comprising a third rod section disposed between first and second ends of the rod.

3. The toy according to claim 2, wherein the handle advances the third rod section through the threaded aperture of the hollow container rotating the plunger and received mixing stick at the outlet maintaining the mixing stick in a non-engaging position when the third rod section is in the threaded aperture and maintaining a freedom of movement upon rotation of the rod.

4. The toy according to claim 3, further comprising a guide element disposed at the aperture of the plunger for maintaining proper positioning of the mixing stick moving through the surface of the plunger between engaging and non-engaging positions.

5. The toy according to claim 1, wherein the hollow container includes a first section and a second section and further comprises a locking mechanism at an end of each of the first and second sections which open to receive a formable material within the hollow container.

6. The toy according to claim 5, wherein at least a portion of the second section is generally cylindrical.

7. The toy according to claim 6, wherein the second section further includes a die at the outlet.

8. The toy according to claim 5, further comprising one or more protrusions at the second section of the container at an end opposite the locking mechanism.

9. The toy according to claim 8, further comprising a play set including one or more well interface, each well interface receiving a protrusion of the hollow container for locking the container into the play set.

10. A toy, comprising:
    a hollow container including a threaded aperture and an outlet;
    a partially threaded rod disposed at the container having first and second ends and including at least a first non threaded section and a second threaded section disposed there between;
    a plunger disposed at the first end of the rod at least partially within the container and including an aperture through a surface of the plunger;
    a mixing stick received through the surface of the plunger at the aperture; and
    a handle disposed at the second end of the rod;
    wherein the handle advances the rod through the threaded aperture of the container, rotating the plunger and received mixing stick in an engaging position when the first non threaded section of the rod is in the threaded aperture and rotated in either of a clockwise or counter clockwise direction and advancing the plunger to an extruding position toward the outlet of the container and sliding the mixing stick to a non-engaging position when the second threaded rod section is rotated within the threaded aperture.

11. The toy according to claim 10, further comprising a guide element disposed at the aperture of the plunger for maintaining proper positioning of the mixing stick moving through the surface of the plunger between engaging and non-engaging positions.

12. The toy according to claim 11, wherein the hollow container includes a first section and a second section and further comprises a locking mechanism at an end of each of the first and second sections which open to receive a formable material within the hollow container.

13. The toy according to claim 12, wherein at least a portion of the second section is generally cylindrical and further includes a die at the outlet.

14. The toy according to claim 13, further comprising one or more protrusions at the second section of the container at an end opposite the locking mechanism and further comprising a play set including one or more wells or indentations, each well or indentation receiving a protrusion of the container for locking the container into the play set.

15. A toy, comprising:
    a hollow container including a threaded aperture and an outlet;
    a rod disposed at the container having first and second ends and including at least first and second rod sections disposed there between, the second rod section being threaded;
    a plunger disposed at the first end of the rod at least partially within the hollow container and including an aperture through a surface of the plunger;
    a mixing stick received through the surface of the plunger at the aperture;
    a handle disposed at the second end of the rod for advancing the plunger to an extruding position toward the outlet of the hollow container; and
    a guide element disposed at the aperture of the plunger for maintaining positioning of the mixing stick.

16. The toy according to claim 15, wherein the hollow container includes a first section and a second section and further comprises a locking mechanism at an end of each of the first and second sections which open to receive a formable material within the hollow container.

17. The toy according to claim 16, wherein at least a portion of the second section is generally cylindrical.

18. The toy according to claim 17, wherein the second section further includes a die at the outlet.

19. The toy according to claim 16, further comprising one or more protrusions at the second section of the container at an end opposite the locking mechanism.

20. The toy according to claim 19, further comprising a play set including one or more well interface, each well interface receiving a protrusion of the hollow container for locking the container into the play set.

* * * * *